Oct. 4, 1955  G. A. BRACE  2,719,702
ELECTRICAL APPLIANCE AND CORD STORAGE DEVICE THEREFOR
Filed May 5, 1953  2 Sheets-Sheet 1

INVENTOR.
George A. Brace
BY *Alfred G. Gross*
ATTORNEY.

United States Patent Office 2,719,702
Patented Oct. 4, 1955

2,719,702

ELECTRICAL APPLIANCE AND CORD STORAGE DEVICE THEREFOR

George A. Brace, Highland Park, Ill., assignor to The Hoover Company, North Canton, Ohio, a corporation of Ohio Application May 5, 1953, Serial No. 353,172

14 Claims. (Cl. 259—84)

Numerous types of electrical appliances have long electric service cords which must be stored when the appliance is not in use. The problem of disposing of the service cord is especially acute if the appliance is stored in a closet or the like when not in use. It is an object of my invention to provide a service cord storage device which is simple, effective, light in weight, of small volume and characterized by the absence of electrical connections between the reel structure and the service cord with which the storage device is used.

It is accordingly a principal object of my invention to provide an electrical appliance of the portable type with a simple and economical means for conveniently storing the service cord when the appliance is not in use, which cord storing means does not add to the bulk of the appliance and is secured without significant additional cost.

It is a more particular object of my invention to provide an electrically energized food mixer with a cord storage device formed by the rotatably mounted platform customarily provided for supporting a mixing bowl in the operation of the device.

It is a further object of my invention to provide a simple and economical cord storage device for electrical appliances which is characterized by the absence of electrical connections and a simple construction embodying an anchor for the connecting plug customarily attached to the end of the service cord.

It is a further object of my invention to provide a cord storage device for an electrically actuated food mixer in which the connecting plug on the end of the service cord may be dropped into a recess provided therefor in the mixing bowl supporting platform and the platform then rotated automatically to wind the cord thereunder for storage in the space between the rotatble platform and the stationary mixer supporting frame.

Other objects and advantages of the invention will become apparent as the description proceeds when taken in connection with the accompanying drawings wherein Fig. 1 is a small scale elevational view of an electrically energized food mixing device embodying my invention;

Figure 1:
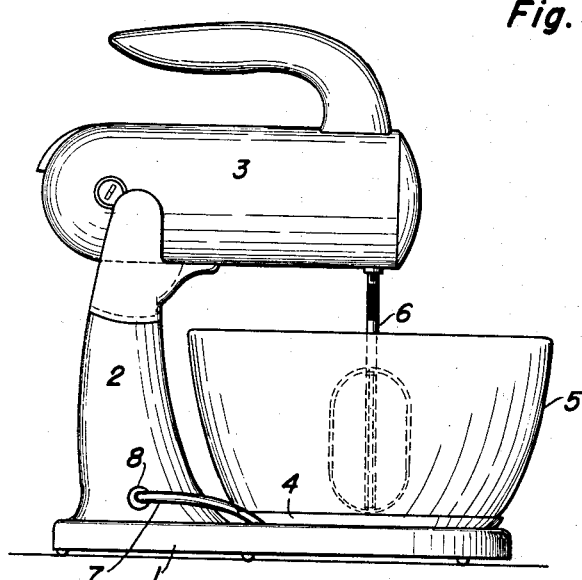

Referring now to the drawing in detail, and first to Fig. 1 thereof, an electrically energized food mixing device is illustrated comprising a stationary base platform 1, which supports an upstanding pedestal 2. A mixer power plant 3 housing an electric drive motor and transmission is supported on the pedestal 2. The power plant 3 may be permanently or detachably mounted on the pedestal 2 in accordance with known practice. Customarily, the power plant is pivotally mounted on the upper end of the pedestal 2 in order to swing upwardly in a counter-clockwise direction from the position shown in Fig. 1 in order to remove the beaters from the mixing bowl and to raise the same above the level of the bowl rim to facilitate removal of the bowl. The pedestal 1 also rotatably supports a dish-shaped bowl supporting turntable 4 upon which a mixing bowl is removably supported. The power plant 3 supports and drives one or more beating elements 6 which depend into the bowl 5 for imparting a mixing or beating action to the contents thereof. The bowl may be rotated by hand or by the beaters in accord with known practice. The foregoing structure is conventional and per se forms no part of my invention.

The electrically driven power plant apparatus 3 is energized by a service cord 7 which, in the illustrated embodiment of the invention, passes into the interior of the hollow pedestal 2 through a grommet 8 and then passes up through the pedestal 2 into the power plant 3. Such an arrangement is preferred for mixing devices of the type in which the power plant 3 is not designed to be detached from the pedestal 2 and utilized as a hand-held and portable mixing device. If the power plant 3 is designed to be detachable from the pedestal 2 and utilized as a hand-held mixing device, the service cord 7 will not pass through the pedestal 2 but will go directly to the power plant structure 3.

The bowl supporting turntable 4 is provided at its center with a depending mounting post 10 which is secured to the inner race of a ball bearing structure 11 by means of a stud and securing washer 12. The ball bearing structure 11 is fixably mounted in a bearing seat provided in a depressed section 13 in the forward portion of the platform 1 underlying the turntable 4. By reason of this structure, the turntable 1 and the mixing bowl are rotatable so as to bring all portions of the bowl into intimate relation with the beating element 6 when the bowl is rotated.

The turntable 4 forms a cord storage device for storing the cord in a safe, concealed position when the mixing device is not in use. To this end, the turntable 4 is provided with a depressed section 15 adjacent the central portion thereof but spaced radially from the center of the turntable a sufficient distance to clear the bearing support for the turntable. The section 15 is adapted to receive a connecting plug 16 mounted on the free end of the service cord 7. The turntable 4 is also provided with a slot 17 extending diagonally to a radius of the turntable 4 inwardly from the periphery to a point spaced from the section 15. The space between section 15 and the inner end of slot 17 is bridged by a depressed section 18 of the turntable 4 shallower than the section 15 but having a depth sufficient to receive that portion of the service cord 7 which is immediately joined to the plug connector 16.

The peripheral portion of the turntable clears the base frame by a distance just sufficient to provide running clearance therebetween which is insufficient to pass the service cord 7. The base frame member 1 is provided with a depressed section 19, as shown most clearly in Figs. 2 and 4, extending roughly tangentially to the turntable from a point well removed from the periphery thereof and leading to the space beneath the turntable 4 to provide a feed trough for the service cord 7 to the under side of the turntable.

A ring 21 having a diameter slightly in excess of the diameter from the center of the turntable 4 to the outer side of the depression 15 is secured to the under side of the turntable 4. The axially extending ring 21 carries an annular radially extending flange 22 on its lower end to provide a channel with the under side of the turntable 4 to receive the innermost portion of the service cord 7 when in storage position. The flange 22 is an optional construction. As shown, the depressed section 13 of the supporting frame 1 is provided with a secondary step portion 23 underlying the flange 22 and joining a less depressed portion 24 having its upper surface coplanar with the upper surface of the flange 22. It is within the purview of the invention to omit the flange 22 entirely and to extend the surface 24 radially inwardly substantially to the lower end of the ring 21 or to project the flange 22 a greater radial distance in order that the same may receive substantially all of the service cord in storage position. The illustrated construction is provided to accommodate a cord locking device to be described hereinafter.

Figure 2:
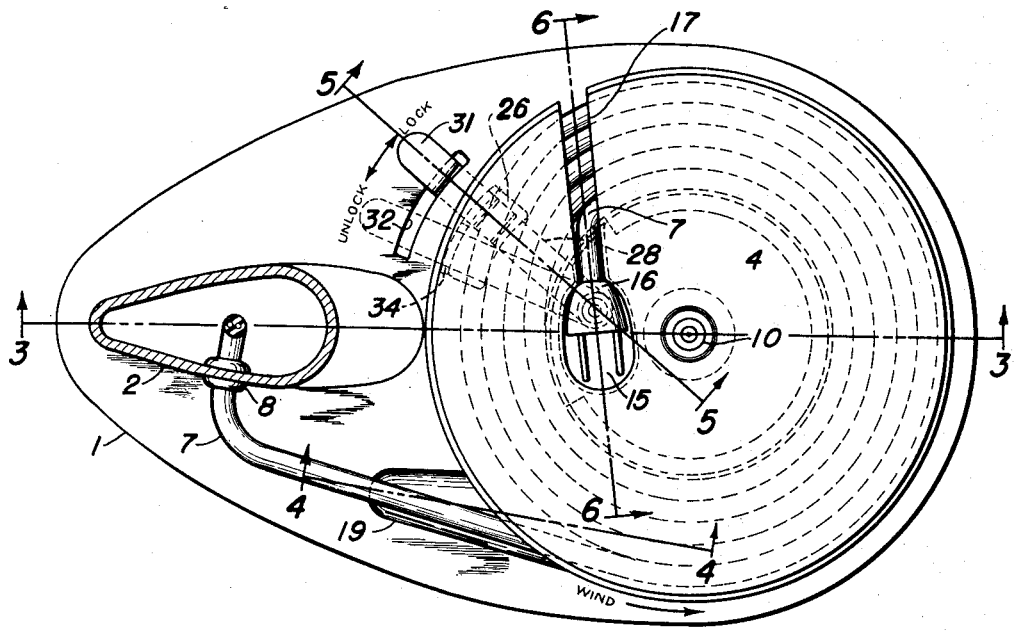
Fig. 2 is a plan view of the rotatable mixing bowl turntable and cord storage structure of the device in Fig. 1.

When it is desired to place the cord in storage position, the turntable is manually rotated until the outer end of slot 17 is aligned with depression 19. The plug 16 is then placed in the depression 15 and the cord is led over the depressed section 18 of the turntable and the same dropped through the slot 17 into the depression 19. The turntable is then manually rotated in the direction indicated by the arrow adjacent the legend "wind" appearing on the upper face of the frame 1 as shown in Fig. 2.

When the free portion of the service cord is substantially fully wound onto the under side of the turntable, the position of the parts shown in Figs. 2 to 6, the outermost turn of the service cord will overlie a slot 26 formed in the step section 24 of the frame 1. The slot 26 is provided to accommodate a cord latching and unlatching device which comprises a leaf spring member 28 pivotally mounted by means of a rivet 29 on the section 13 of the frame 1, and provided with an upwardly bent locking section 30 extending through the slot 26. The member 28 is also provided with an actuating portion 31 which extends upwardly through a slot 32 in the portion of the frame 1 outwardly of the turntable 4 in order that the end 31 may be manually engaged for actuating the locking device.

Figure 3:
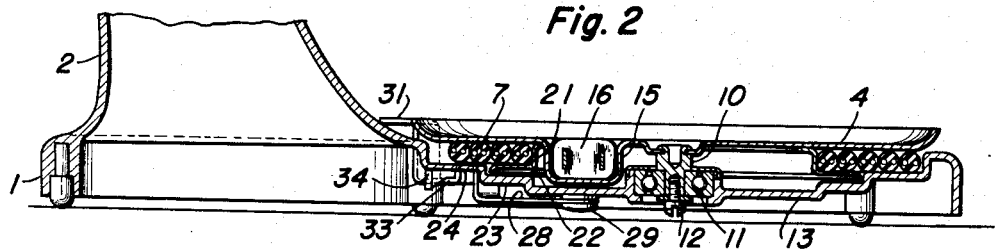
Fig. 3 is a sectional view taken along the line 3—3 of Fig. 2 looking in the direction of the arrows.
Figure 4:
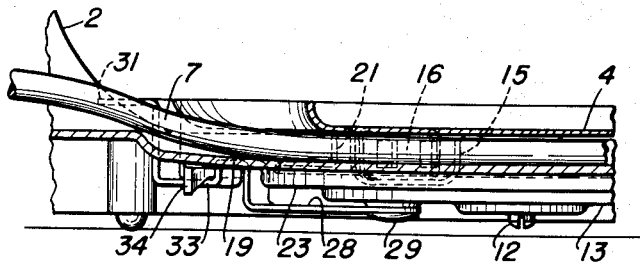
Fig. 4 is a partial sectional view taken along the line 4—4 of Fig. 2 looking in the direction of the arrows.
Figure 5:
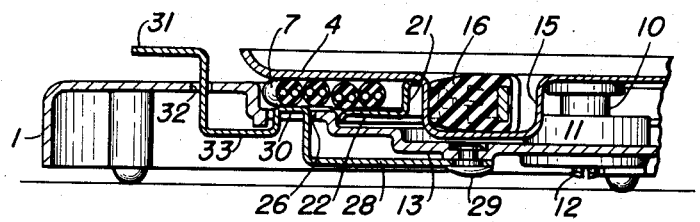
Fig. 5 is a sectional view taken along the line 5—5 of Fig. 2 looking in the direction of the arrows.
Figure 6:
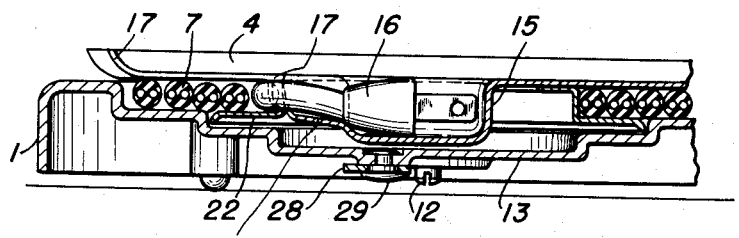
Fig. 6 is a sectional view taken along the line 6—6 of Fig. 2 looking in the direction of the arrow.

As shown most clearly in Figs. 3 and 4, the locking member 28 is provided with a horizontal section 33 adjoining the sections 30 and 31 thereof and in position to engage a downwardly projecting cam 34 on the under side of the base frame 1. When the member 28 is rocked to the locking position which is illustrated in Figs. 2, 3 and 5, the section 33 thereof underlies the low section of the cam and the inert resiliency of the member 28 urges section 30 thereof upwardly into frictional engagement with the outermost turn of the service cord which is then biased against the under surface of the turntable 4. Thus the member 28 frictionally and releasably holds the turntable and service cord against accidental rotation and undesired release of the service cord. When it is desired to release the service cord, the section 31 of the member 28 is manually moved in a clockwise direction, as viewed in Fig. 2, to the limit allowed by the slot 32, which movement rides the section 33 of the locking device onto the high portion of the cam 34 depressing the member 28 and removing the same from engagement with the service cord. The cord may now be unwound from the storage position by grasping a section thereof running through depression 19 to the pedestal 2 and pulling upon this portion of the cord, which will rotate the turntable counter-clockwise until the cord is entirely removed therefrom.

The above described cord storage device utilizes the bowl supporting turntable provided with the mixer as a major portion of the cord storage mechanism and stores the cord neatly in a concealed position and one in which the card cannot be free or project beyond the confines of the mixer to catch on other objects or to provide a problem of holding the same in proper relation to the mixing device. When the device is in use, the cord is completely dissociated from the turntable and hence does not in any way interfere with the normal functioning of the turntable when the mixer is in use. The connector plug end of the service cord is releasably secured in a recess in the turntable so that the upper surface thereof is either below or coplanar with the upper surface of the turntable and hence does not interfere with the common usage of the turntable to store a mixing bowl when the mixer is not in use.

Figure 7:
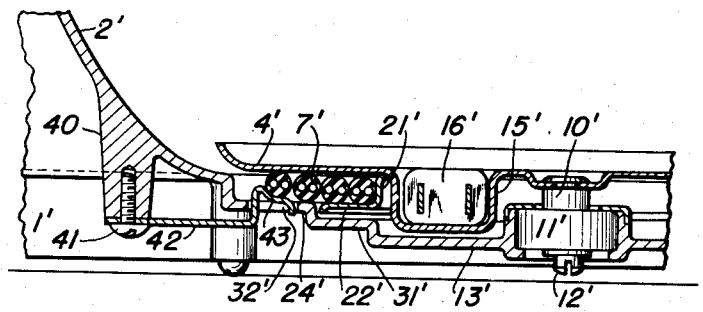
Fig. 7 is a view similar to Fig. 2 illustrating a modified form of the invention.

Referring now to Fig. 7, a modified form of the invention is illustrated. This form of the invention is identical with that disclosed and described in connection with Figs. 1 to 4, except with respect to the nature of the latching means provided to prevent accidental and undesired release of the cord during storage. Consequently, those parts of the apparatus shown in Fig. 7 which correspond to identical parts heretofore described in connection with Figs. 1 to 6 will be given the same reference characters as such parts and distinguished by the addition of a prime.

In this form of the invention, the latching mechanism comprises a downwardly depending lug 40 on the pedestal 2. The lower end of the lug 40 is threaded to receive a stud 41 which anchors a spring finger 42 to the lower end of the lug below the level of the portion 24' of the base frame 1'. The spring finger 42 is biased upwardly and is provided with an end portion extending upwardly through the slot 32' terminating in an inclined section 43 adapted to engage the outermost turn of the stored cord 7' to bias the cord 7' against the under side of the turntable 4' and thus to hold the turntable 4' and service cord 7' against rotation in the storage position thereof.

In the use of this form of the invention, the cord is placed in the storage position by following the procedure outlined above in connection with Figs. 1 to 6. As the last turn of the service cord is wound beneath the turntable 4', it rides over and frictionally engages the section 43 of the spring latch 42. The frictional engagement between the parts under this condition need not be very great and the cord can be wound a slight distance after the first engagement between the cord and the spring retainer. The frictional force exerted by the retainer 42 is sufficient to prevent accidental release of the parts or accidental rotation of the turntable 4'. When it is desired to remove the service cord for use, the procedure followed is exactly that described above in connection with the first form of the invention. The first few inches of the cord removed from the reel will require a harder pull than that required to release the cord in the first form of the invention until sufficient cord is unwound to remove the same from contact with the fixed position retaining finger 42 after which the turntable will rotate freely with a very slight pull until the cord is completely unwound.

In each form of my invention, the mixer turntable is utilized to form a cord storage reel for the service cord which is wound in the space usually provided beneath the turntable in mixers of this type and with a minimum of additional parts. Hence, the cord storage facility may be added to the mixer at a very slight increase in cost and without providing extra electrical connections or in any way disturbing the normal relation of the service cord to the power plant portion of the apparatus.

Though I have described my invention with particular reference to an electrically energized food mixer, it is to be understood that the cord reel features per se are applicable to other forms of electrical appliance merely by extending the flange 22 or 22" as the case may be to a radial distance sufficient to accommodate the full length of the service cord which may be wound thereon. If the service cord storage reel is mounted on the appliance, then a portion of the appliance wall may be formed just as herein described in connection with the section 13, 23 and 24 of the frame 1 to cooperate with a disc corresponding to the turntable 4 and also to provide a mounting for a latching device if that is desired.

While I have illustrated and described the invention in considerable detail, it is to be understood that various changes may be made in the arrangement, proportion and construction of parts without departing from the spirit of the invention or the scope of the appended claims.

I claim:

1. In a food mixing apparatus having a base frame, an electrically energized food mixing device, a pedestal on said base frame supporting said mixing device and a service cord having one end connected to said electrically energized device and having a connector plug on its free end, the combination of a turntable rotatably mounted on said base frame for supporting a mixing bowl in operative relation to said mixing device, means on said turntable for releasably securing said connector plug thereto, a slot in said turntable for allowing the portion of the service cord adjacent to said connector plug to pass to the underside of the turntable, and means on said frame and said turntable forming a cord reel therebetween whereby rotation of the turntable with the connector plug secured thereto will wind or unwind the service cord beneath the turntable.

2. In a food mixing apparatus having a base frame, an electrically energized food mixing device, a pedestal on said base frame supporting said mixing device and a service cord having one end connected to said electrically energized device and having a connector plug on its free end, the combination of a turntable rotatably mounted on said base frame for supporting a mixing bowl in operative relation to said mixing device, said turntable having a depressed portion in its upper surface adapted to receive the connector plug and the portion of the service cord connected directly thereto, a slot in the turntable extending inwardly from the periphery thereof to said depressed portion, a ring on the under side of said turntable outwardly of the depressed portion thereof whereby the service cord may be wound on said ring beneath the turntable by rotating the turntable after placing the connector plug in said depressed portion with the portion of the cord directly joined to the connector plug extending through said slot to the under side of the turntable.

3. Apparatus according to claim 2 in which the peripheral portion of said turntable is closely adjacent the base frame and the base frame adjacent and within the perimeter of the turntable is spaced from the turntable a distance sufficient to accommodate a service cord spirally wound on said ring, and a trough-like depression in said base frame extending from a point beneath said turntable to a point remote therefrom to provide a feeding guide for the service cord to the space between the turntable and base frame.

4. Apparatus according to claim 2 including a spring member mounted on the base frame and having a portion extending into the space between the frame member and the turntable in position to engage the service cord frictionally when a predetermined length of the cord is wound beneath the turntable for releasably restraining the turntable and service cord against rotary movement.

5. Apparatus according to claim 4 in which said spring member is mounted on the base frame for adjusting movement with respect thereto, a cam on the base frame adapted to hold said spring member in an inoperative position, and manually engageable means on said spring member for moving said spring member into and out of engagement with said cam.

6. A service cord storage device comprising a frame member, a disc-like winding member, means rotatably mounting said disc-like member on said frame member in spaced relation thereto to provide space for winding a service cord in a spiral between said members, said disc-like member having a section thereof adjacent said mounting means depressed inwardly toward said frame member shaped to receive a service cord connector plug, a slot in said disc-like member extending inwardly from the periphery thereof to a point adjacent said depressed section whereby a service cord joined to a connector in said depressed section may pass through said slot to the space between said member, and a ring element attached to said disc-like member between said members about which a service cord may be wound by rotating said disc-like member.

7. Apparatus according to claim 6 including a radial flange mounted on said ring in spaced relation to said disc-like member to provide a cord receiving channel around said ring between said flange and disc-like member.

8. Apparatus according to claim 6 including a spring biased member on said frame member positioned to engage the stored service cord when a predetermined length thereof has been wound about said ring and to bias the engaged portion of the service cord against the disc-like member to hold the cord and disc against accidental rotation.

9. In a food mixing apparatus having a base frame, a mixer power plant supported by the base frame and a service cord connected to the power plant and having a free end provided with a connector plug, the combination of a turntable rotatably supported on the base frame in position to support a mixing bowl in operative relation to the power plant, said turntable having means thereon for releasably retaining the connector plug, and a slot in the turntable for passing the portion of the service cord directly joined to the connector plug to the space between the turntable and the base frame whereby the turntable may be rotated to wind the service cord into the space between the turntable and base frame.

10. Apparatus according to claim 9 in which the peripheral portion of the turntable and base frame are spaced to provide running clearance therebetween and the base frame is provided with a depressed portion extending from a point positioned outwardly of the turntable to a point within the peripheral portion of the turntable to form a channel for guiding the cord during winding or unwinding operations.

11. Apparatus according to claim 9 including an axially extending ring on the turntable in the space between the turntable and base frame, and a flange on the ring spaced from the turntable providing a cord receiving channel about the ring between the flange and turntable.

12. Apparatus according to claim 9 including a spring biased member on the frame for frictionally engaging the service cord when a predetermined length thereof is wound between the turntable and base frame and biasing the engaged portion of the service cord into engagement with the turntable to prevent accidental rotation thereof.

13. A service cord storing device comprising a frame member, a disc-like member rotatably mouned on said frame member and spaced therefrom to provide space between said members for winding a service cord in a spiral therebetween, means for releasably attaching a service cord connector plug to said disc-like member with the portion of the cord immediately joined to the connector plug extending into the space between said members whereby manual rotation of said disc-like member will wind a service cord in a spiral between said member.

14. In an electrically energized appliance having a frame structure and an electric service cord connected to the appliance at one end thereof and having a free end terminating in a connecting plug, a disc-like member rotatably mounted on said frame and spaced therefrom a distance sufficient to accommodate a service cord therebetween, a depression formed in said member adjacent the central portion thereof adapted to receive said connecting plug for storage, a slot in said member extending from the periphery thereof to a point adjacent said depression whereby said plug may be placed in said depression with said service cord extending through said slot to be wound between said member and said frame by rotating said member.

References Cited in the file of this patent

UNITED STATES PATENTS

| | | |
|---|---|---|
| 777,926 | Stevens | Dec. 20, 1904 |
| 1,166,753 | Finizio | Jan. 4, 1916 |
| 1,696,495 | Malling | Dec. 25, 1928 |
| 2,536,776 | Smellie | Jan. 2, 1951 |
| 2,615,691 | Bisley | Oct. 28, 1953 |